United States Patent
Endo et al.

(10) Patent No.: US 8,580,411 B2
(45) Date of Patent: Nov. 12, 2013

(54) GLASS FOR SUBSTRATE, AND GLASS SUBSTRATE

(75) Inventors: Jun Endo, Chiyoda-ku (JP); Tetsuya Nakashima, Chiyoda-ku (JP); Atsuyoshi Takenaka, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 48 days.

(21) Appl. No.: 13/271,322

(22) Filed: Oct. 12, 2011

(65) Prior Publication Data

US 2012/0100397 A1      Apr. 26, 2012

(30) Foreign Application Priority Data

Oct. 26, 2010 (JP) ................... 2010-239515

(51) Int. Cl.
*G11B 5/73* (2006.01)
*C03C 3/083* (2006.01)

(52) U.S. Cl.
USPC ........................................ 428/846.9; 501/69

(58) Field of Classification Search
USPC ........... 428/846.9, 410, 848, 426, 141, 846.2; 65/30.14; 501/69, 70, 125, 135, 67, 66, 501/68; 106/789; 360/135; 216/88
See application file for complete search history.

(56) References Cited

U.S. PATENT DOCUMENTS

| 6,440,531 | B1 | 8/2002 | Kurachi et al. |
| 6,576,353 | B1 | 6/2003 | Mitani et al. |
| 7,838,136 | B2 * | 11/2010 | Nakashima et al. ....... 428/846.9 |
| 8,349,476 | B2 * | 1/2013 | Endo et al. ................. 428/846.9 |
| 2002/0193233 | A1 * | 12/2002 | Kishimoto et al. ............ 501/69 |
| 2003/0232173 | A1 * | 12/2003 | Saito et al. ..................... 428/141 |
| 2006/0070980 | A1 * | 4/2006 | Marumo et al. ................ 216/88 |
| 2009/0110963 | A1 * | 4/2009 | Nakashima et al. ....... 428/846.2 |
| 2010/0152333 | A1 * | 6/2010 | Berthereau et al. ........... 106/788 |
| 2010/0255350 | A1 * | 10/2010 | Endo et al. ................. 428/846.9 |
| 2011/0123710 | A1 | 5/2011 | Endo et al. |
| 2011/0123833 | A1 | 5/2011 | Endo et al. |
| 2011/0159318 | A1 | 6/2011 | Endo et al. |

FOREIGN PATENT DOCUMENTS

| JP | 2004-59419 | 2/2004 |
| JP | 2006-99847 | 4/2006 |
| JP | 2008-90898 | 4/2008 |
| JP | 2009-280478 | 12/2009 |

* cited by examiner

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

To provide glass to be used for a substrate which is, as a substrate, less susceptible to surface roughening even if subjected to cleaning by means of a strongly acidic solution.

Glass for a substrate, which comprises, as represented by mol % based on the following oxides, from 62.5 to 69% of $SiO_2$, from 9 to 15.5% of $Al_2O_3$, from 8 to 16 of $Li_2O$, from 0 to 8% of $Na_2O$, from 0 to 7% of $K_2O$ and from 0 to 3.5% of $ZrO_2$, provided that $SiO_2$—$Al_2O_3$ is at least 53.3%, $Li_2O+Na_2O+K_2O$ is from 17 to 24%, and the total of contents of the above six components is at least 97%.

17 Claims, 2 Drawing Sheets

GLASS FOR SUBSTRATE, AND GLASS SUBSTRATE

TECHNICAL FIELD

The present invention relates to an information recording medium such as a magnetic disk (hard disk), a glass substrate to be used for such an information recording medium, and glass to be used for such a substrate.

BACKGROUND ART

Substrates for information recording media, particularly glass substrates as substrates for magnetic disks, are widely used, and commercially available glass is known which has a composition comprising, as represented by mol %, 65.4% of $SiO_2$, 8.6% of $Al_2O_3$, 12.5% of $Li_2O$, 10.5% of $Na_2O$ and 3.0% of $ZrO_2$. This commercially available glass is subjected to chemical strengthening treatment before use.

On the other hand, glass A for a magnetic disk substrate has been proposed which may or may not be subjected to chemical strengthening treatment (Patent Document 1). This glass A comprises, as represented by mol %, from 61 to 66% of $SiO_2$, from 11.5 to 17% of $Al_2O_3$, from 8 to 16% of $Li_2O$, from 2 to 8% of $Na_2O$, from 2.5 to 8% of $K_2O$, from 0 to 6% of MgO, from 0 to 4% of $TiO_2$ and from 0 to 3% of $ZrO_2$, wherein $Al_2O_3+MgO+TiO_2$ is at least 12%, $Li_2O+Na_2O+K_2O$ is from 16 to 23%, and in a case where $B_2O_3$ is contained, its content is less than 1%.

Meanwhile, in a process for producing a glass substrate, polishing is, in many cases, carried out by means of a slurry containing cerium oxide abrasive grains. For example, in the production of a glass substrate to be used for an information recording medium such as a magnetic disk, the main surface and the edge surface of a glass disk cut out from a glass plate, are polished by means of a slurry containing cerium oxide abrasive grains, and then, in order to further planarize the main surface, final polishing may be carried out by means of a slurry containing colloidal silica abrasive grains. At that time, even if cerium oxide abrasive grains may remain on the main surface, they will be removed by the final polishing, but cerium oxide abrasive grains attached to the edge surface are likely to remain without being removed, and in a cleaning step after the final polishing, they are likely to re-deposit on the main surface to constitute product defects.

Under such backgrounds, it is desired to completely remove cerium oxide abrasive grains, and a cleaning liquid containing an inorganic acid and a reducing agent has been proposed (e.g. Patent Documents 2 and 3). In this proposal, it is said that cerium oxide abrasive grains are dissolved and removed by the action of the inorganic acid and ascorbic acid.

Further, it has been also proposed to use a cleaning liquid containing heated sulfuric acid as the main component, in the cleaning of the final step (e.g. Patent Document 4).

PRIOR ART DOCUMENTS

Patent Documents

Patent Document 1: JP-A-2009-280478
Patent Document 2: JP-A-2006-99847
Patent Document 3: JP-A-2004-59419
Patent Document 4: JP-A-2008-90898

DISCLOSURE OF INVENTION

Technical Problem

These cleaning liquids have a pH as low as at most 2, whereby in the case of glass having low acid resistance, defects may be formed on the glass substrate surface.

The above mentioned glass A is said to be one having high acid resistance and being free from surface roughing in a polishing step or a cleaning step at a low pH. However, when the present inventors cleaned glass belonging to glass A by means of a sulfuric acid/hydrogen peroxide mixed liquid at 80° C., formation of irregular defects was observed (as shown in FIG. 4).

The present invention has been made in view of the above problem, and it is an object of the present invention to provide a glass substrate for an information recording medium excellent particularly in acid resistance, whereby defects are less likely to be formed on the glass substrate surface even when a cleaning liquid having a pH of at most 2 is used.

Solution to Problem

The present invention provides glass for a substrate, which comprises, as represented by mol % based on the following oxides, from 62.5 to 69% of $SiO_2$, from 9 to 15.5% of $Al_2O_3$, from 8 to 16% of $Li_2O$, from 0 to 8% of $Na_2O$, from 0 to 7% of $K_2O$ and from 0 to 3.5% of $ZrO_2$, provided that $SiO_2$—$Al_2O_3$ is at least 53.3%, $Li_2O+Na_2O+K_2O$ is from 17 to 24%, and the total of contents of the above six components is at least 97%. Here, for example, "contains from 0 to 8% of $Na_2O$" means that $Na_2O$ is not essential, but may be contained in a range of up to 8%, and "$SiO_2$—$Al_2O_3$" is a difference obtained by subtracting the content of $Al_2O_3$ from the content of $SiO_2$.

Further, the present invention provides the above glass for a substrate, wherein $SiO_2$ is from 64 to 68%, $Al_2O_3$ is from 9 to 13%, $Li_2O$ is from 10 to 15%, $Na_2O$ is from 3 to 7%, $K_2O$ is from 1 to 5% and $Li_2O+Na_2O+K_2O$ is from 19 to 23%.

Further, the present invention provides the above glass for a substrate, wherein $SiO_2$—$Al_2O_3$ is at most 56.0%.

Further, the present invention provides the above glass for a substrate, wherein the total of contents of the above six components is at least 98%.

Further, the present invention provides the above glass for a substrate, which contains from 0 to 2% of MgO.

Further, the present invention provides the above glass for a substrate, which does not contain any one of CaO, SrO and BaO, or contains at least one component of CaO, SrO and BaO, provided that the total of their contents is at most 1%.

Further, the present invention provides the above glass for a substrate, wherein the substrate is a substrate for an information recording medium.

Further, the present invention provides the above glass for a substrate, wherein the information recording medium is a magnetic disk.

Further, the present invention provides a glass substrate made of the above glass for a substrate.

Further, the present invention provides a chemically strengthened glass substrate having the above glass substrate chemically strengthened.

Further, the present invention provides a magnetic disk having a magnetic recording layer formed on a glass substrate for a magnetic disk made of the above glass for a substrate or on a chemically strengthened glass substrate having a glass substrate made of the same glass for a substrate chemically strengthened.

Advantageous Effect of Invention

According to the present invention, it is possible to obtain a glass substrate excellent particularly in acid resistance, whereby defects are less likely to be formed on the surface even when a cleaning liquid having a pH of at most 2 is used. Further, a cleaning liquid having a pH of at most 2 can be used, whereby cerium oxide abrasive grains can be efficiently removed from the glass substrate, and it becomes possible to produce a high quality glass substrate for an information recording medium.

Even without chemical strengthening treatment, it is possible to obtain glass to be used for e.g. a substrate for an information recording medium, whereby the alkali precipitation total amount after the durability test is small. Thus, in a case where it is applied to e.g. a magnetic disk substrate, a film such as an undercoating film, a magnetic film or a protective film formed on such a substrate is less likely to be peeled. Further, it is considered possible to suppress diffusion of Na into the magnetic film thereby to obtain e.g. a highly reliable magnetic disk.

Further, it is possible to produce a glass substrate for an information recording medium without carrying out chemical strengthening treatment, the number of process steps can be reduced, and it is possible to solve a problem of attachment of dirt on the substrate surface after chemical strengthening treatment.

Further, it is possible to obtain glass for a substrate having a high Young's modulus or specific modulus to be used for e.g. an information recording medium, whereby warpage or deflection is less likely to occur during the drive rotation, and it is possible to obtain an information recording medium with a high recording density.

Further, it is possible to obtain glass for a substrate having a low density to be used for an information recording medium, whereby the motor load during the drive rotation can be reduced, and a low power consumption can be achieved.

Further, it is possible to obtain glass for a substrate having a large average linear expansion coefficient to be used for e.g. an information recording medium, whereby thermal expansion matching with a drive or other component made of a metal will be high, a stress to be formed at the time of a temperature change will be small, and the substrate breakage or the like is less likely to occur.

Further, it is possible to obtain glass for a substrate having a high glass transition point to be used for e.g. an information recoding medium, whereby the temperature for heat treatment to be carried out after forming a magnetic film on the substrate can be made high, and it is possible to obtain an information recording medium with a high recording density.

DESCRIPTION OF EMBODIMENTS

Figure 1:
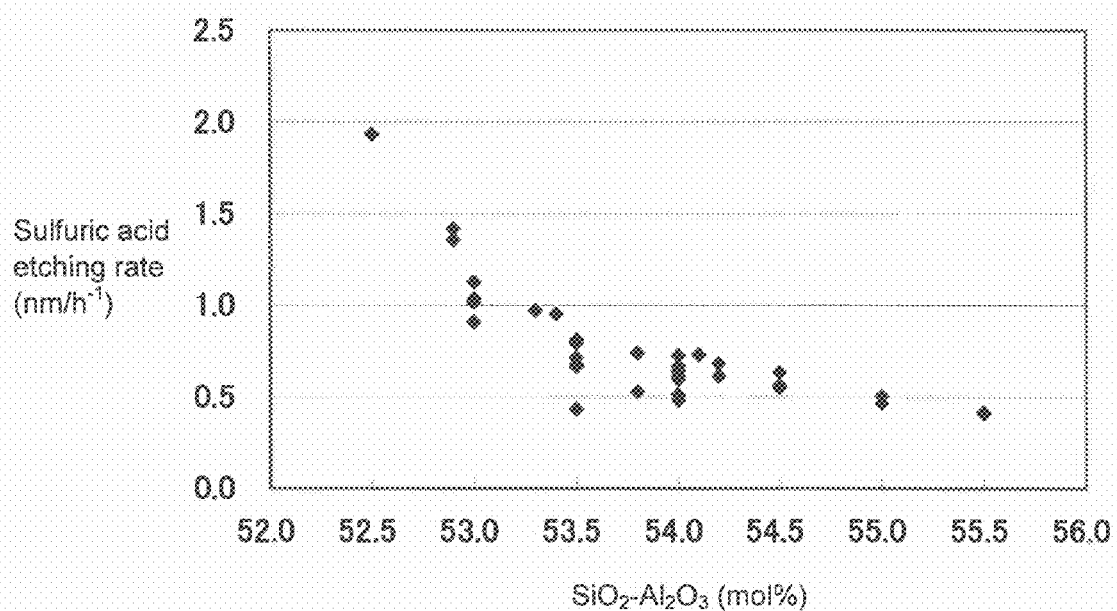
FIG. 1 is a graph showing a relationship between $SiO_2$—$Al_2O_3$ and the sulfuric acid etching rate.

The glass for a substrate of the present invention (hereinafter referred to as the glass of the present invention) preferably has a sulfuric acid etching rate w of at most 1.0 nm/h, as measured as follows. If w exceeds 1.0 nm/h, defects are likely to be formed on the glass surface as mentioned above in the case of using a strongly acidic liquid having a pH of at most 2 in the surface polishing or the final cleaning step in the process for producing an information recording medium, particularly a glass substrate for a magnetic disk. It is more preferably at most 0.9 nm/h, further preferably at most 0.85 nm/h, further preferably at most 0.8 nm/h, further preferably at most 0.75 nm/h, still further preferably at most 0.7 nm/h, particularly preferably at most 0.6 nm/h.

<Method for Measuring Sulfuric Acid Etching Rate w>

Both sides of a glass plate having a thickness of from 1 to 2 mm and a size of 4 cm×4 cm were mirror-polished by colloidal silica, and its edge surface was mirror-polished by cerium oxide abrasive grains to obtain a sample for measurement, which was immersed in 16.6 wt % (3.6 N) sulfuric acid at 60° C. for 5 hours, whereupon the amount of Si eluted into the sulfuric acid was analyzed and measured by an ICP mass analysis. The etched amount of the glass was calculated from the obtained Si amount, the $SiO_2$ content in the glass and the density of the glass. That is, $1,000 \times L/(d \times P \times (\text{atomic weight of Si})/(\text{molecular weight of } SiO_2))$ was calculated, where P (unit: mass %) is the content as represented by mass percentage, of $SiO_2$ in the glass, d (unit: g/cm$^3$) is the density of the glass and L (unit: μg/cm$^2$) is the eluted amount per unit area of the glass plate, of Si eluted during the immersion in sulfuric acid. The calculated value is taken as the etching amount (unit: nm) per one side of the glass substrate.

This etching amount is divided by five hours=300 minutes, and the obtained value is taken as the sulfuric acid etching rate.

Now, the glass of the present invention will be described with reference to a case where it is used for a magnetic disk substrate, but it should be understood that the present invention is by no means restricted thereto.

The density d of the glass of the present invention is preferably at most 2.60 g/cm$^3$. If it exceeds 2.60 g/cm$^3$, the motor load will be exerted during the drive rotation, and the power consumption tends to be large, or the drive rotation is likely to be unstable. Preferably, it is at most 2.54 g/cm$^3$.

The glass of the present invention preferably has Young's modulus E of at least 76 GPa and a specific modulus E/d of at least 28 MNm/kg. If E is less than 76 GPa or E/d is less than 28 MNm/kg, warpage or deflection is likely to occur during the drive rotation, and it is likely to be difficult to obtain an information recording medium with a high recording density. It is more preferred that E is at least 77 GPa, and E/d is at least 30 MNm/kg.

The glass transition point Tg of the glass of the present invention is preferably at least 500° C. If it is less than 500° C., it tends to be difficult to make the heat treatment temperature for forming a magnetic layer sufficiently high, and it is likely to be difficult to increase the coercive force of the magnetic layer. It is more preferably at least 510° C.

The average linear expansion coefficient α within a range of from −50 to 70° C., of the glass of the present invention, is preferably at least 56×10$^{-7}$/° C. If it is less than 56×10$^{-7}$/° C., the difference in the thermal expansion coefficient from other component such as a drive made of a metal tends to be large, and it is likely that substrate breakage or the like occurs due to formation of a stress at the time of a temperature change. It is more preferably at least $58\times10^{-7}/°$ C. Typically, $\alpha$ is at most $100\times10^{-7}/°$ C.

If at the time when the glass substrate of the present invention is held for 20 hours in a steam atmosphere at 120° C. under 0.2 MPa, the amount of Li, the amount of Na and the amount of K precipitated on the glass surface are represented by $C_{Li}$, $C_{Na}$ and $C_K$, respectively, $C_R=C_{Li}+C_{Na}+C_K$ is preferably at most 12 nmol/cm². If $C_R$ exceeds 12 nmol/cm², films such as an underlayer film, a magnetic film, a protective film, etc. formed on the substrate are likely to be peeled. $C_R$ is more preferably at most 11 nmol/cm², further preferably at most 5 nmol/cm², particularly preferably at most 3.5 nmol/cm².

Now, the composition of the glass of the present invention will be described, as represented by mol %.

$SiO_2$ is a component to form the skeleton of the glass and is essential. If it is less than 62.5%, the acid resistance or the weather resistance will decrease, d will increase, the glass tends to be susceptible to scratching, or the liquid phase temperature will increase, whereby the glass becomes unstable. It is preferably at least 63%, more preferably at least 64%, particularly preferably at least 65%. If it exceeds 69%, the temperature $T_2$ at which the viscosity becomes $10^2$ dPa·s and the temperature $T_4$ at which the viscosity becomes $10^4$ dPa·s will increase, whereby melting and forming of the glass tend to be difficult, E or E/d will decrease, or $\alpha$ becomes small. It is preferably at most 68%, more preferably at most 67%.

$Al_2O_3$ has an effect to increase weather resistance and is essential. If it is less than 9%, such an effect will be small, or E or E/d or Tg will decrease. It is preferably at least 10%, more preferably at least 10.5%, further preferably at least 11%, particularly preferably at least 11.5%. If it exceeds 15.5%, the above-mentioned $T_2$ and $T_4$ will increase, whereby melting and forming of the glass tend to be difficult, the acid resistance will decrease, a becomes small, or the liquid phase temperature tends to be too high. It is preferably at most 15%, more preferably at most 14.5%, further preferably at most 13.5%, particularly preferably at most 13%.

The present inventors have found that the sulfuric acid etching rate w is suitable as an index for formation of surface defects in the above-mentioned strongly acidic cleaning, and this w strongly depends on $SiO_2$—$Al_2O_3$ and yet, such dependency remarkably changes at $SiO_2$—$Al_2O_3$=53.3% as the turning point, and thus have arrived at the present invention. This point will be described later with reference to FIG. 1.

If $SiO_2$—$Al_2O_3$ is less than 53.3%, the acid resistance will decrease, and the degree of such a decrease becomes remarkable. In order to make such an effect more distinct, it is preferably made to be at least 53.5%, more preferably at least 53.7%, particularly preferably at least 54.0%. $SiO_2$—$Al_2O_3$ is preferably at most 59%. If it exceeds 59%, $T_2$ and $T_4$ will increase, and melting and forming of the glass are likely to be difficult. It is more preferably at most 58%, further preferably at most 57%, particularly preferably at most 56%, most preferably at most 55.5%. In a case where it is desired to increase the weather resistance, $SiO_2$—$Al_2O_3$ is preferably at most 56.0%.

$Li_2O$ has an effect to increase E, E/d or $\alpha$, or to improve the melting performance of the glass, and is essential. If it is less than 8%, such an effect will be small. It is preferably at least 9%, more preferably at least 10%, particularly preferably at least 11%. If it exceeds 16%, the acid resistance or weather resistance will decrease, or Tg will be low. It is preferably at most 15%, more preferably at most 14%, particularly preferably at most 13.5%.

$Na_2O$ is not essential, but it may be contained up to 8%, since it has an effect to increase a or to improve the melting performance of the glass. If it exceeds 8%, the acid resistance or weather resistance will decrease, or $T_g$ will be low. It is preferably at most 7.5%, more preferably at most 7%, further preferably at most 6.5%, particularly preferably at most 6%. Further, when $Na_2O$ is contained, its content is preferably at least 1%, more preferably at least 2%, further preferably at least 3%, particularly preferably at least 4%.

$K_2O$ is not essential, but it may be contained up to 7%, since it has an effect to increase $\alpha$ or to improve the melting performance of the glass. If it exceeds 7%, the acid resistance or weather resistance will decrease, or $T_g$ will be low. It is preferably at most 6%, more preferably at most 5.5%, further preferably at most 5%, particularly preferably at most 4.5%. Further, when $K_2O$ is contained, its content is preferably at least 0.5%, more preferably at least 1%, further preferably at least 1.5%.

If $R_2O$ the total of contents of $Li_2O$, $Na_2O$ and $K_2O$ is less than 17%, $\alpha$ will be small, or the melting performance of the glass will decrease. It is preferably at least 18%, more preferably at least 18.5%, further preferably at least 19%, particularly preferably at least 19.5%. If $R_2O$ exceeds 24%, the acid resistance or weather resistance will decrease. It is preferably at most 23.5%, more preferably at most 23%, further preferably at most 22.5%, particularly preferably at most 22%.

$ZrO_2$ is not essential, but it may be contained up to 3.5%, since it has an effect to increase E or E/d while maintaining the weather resistance, to increase Tg or to improve the melting performance of the glass. If it exceeds 3.5%, d will increase, the glass is likely to be susceptible to scratching, or the liquid phase temperature is likely to be too high. It is preferably at most 3%, more preferably at most 2.5%, typically at most 2%.

The glass of the present invention consists essentially of the above components, but it may contain other components within a range not to impair the purpose of the present invention i.e. in a total within a range of less than 3%, preferably less than 2%, typically less than 1%.

For example, MgO may increase the liquid phase temperature, but may have an effect to increase E, E/d or $\alpha$ while maintaining the weather resistance, to make the glass to be less susceptible to scratching, or to improve the melting performance of the glass. Its content in such a case is preferably at most 2%, more preferably at most 1%, but typically, it may not be contained.

$TiO_2$ may increase the liquid phase temperature or may promote a phase separation phenomenon, but may have an effect to increase E, E/d or Tg or to increase the weather resistance. Its content in such a case is preferably at most 2%, more preferably at most 1%, but typically it may not be contained.

CaO, SrO or BaO may increase d or may make the glass to be susceptible to scratching, but may have an effect to increase $\alpha$ while maintaining the weather resistance, or to improve the melting performance of the glass. In such a case, their total content is preferably at most 1%, more preferably at most 0.75%, typically at most 0.5%.

In a case where it is desired to make the glass less susceptible to scratching, BaO is preferably at most 1%, more preferably at most 0.5%.

In a case where it is desired to increase E or E/d, or to make the glass less susceptible to scratching, CaO is preferably at most 1%, more preferably at most 0.5%.

Further, clarifying agents such as $SO_3$, Cl, $As_2O_3$, $Sb_2O_3$, $SnO_2$, etc. may be contained up to 2% in total.

Further, colorants such as $Fe_2O_3$, $Co_3O_4$, NiO, etc. may be contained up to 2% in total.

Further, $B_2O_3$ is preferably not contained, since it becomes very volatile in coexistence with an alkali metal oxide component, and even in a case where it is contained, its content is less than 1%, preferably less than 0.5%.

A glass substrate for an information recording medium made of the glass of the present invention is usually a circular glass plate.

The glass substrate for a magnetic disk is widely used for e.g. a 2.5 inch substrate (outer diameter of the glass substrate: 65 mm) to be used for e.g. a notebook personal computer, or for a 1.8 inch substrate (outer diameter of the glass substrate: 48 mm) to be used for e.g. a portable MP3 player, and its market is expanding every year. On the other hand, its supply at a low price is desired. Glass to be used for such a glass substrate is preferably one suitable for mass production.

Mass production of plate glass is widely carried out by a continuous-forming method such as a float process, a fusion method or a downdraw method, and as mentioned above, the glass of the present invention is glass which can be formed by a float process, and thus, it is suitable for mass production.

The process for producing the glass and the glass substrate of the present invention is not particularly limited, and various processes may be used. For example, materials for the respective components commonly used are blended to have a desired composition, and such a mixture is heated and melted in a glass melting furnace. Then, the glass is homogenized by e.g. bubbling, stirring or addition of a clarifying agent, followed by forming into a plate glass having a predetermined thickness by a well-known method such as a float process, a press method, a fusion method or a downdraw method, and then, after annealing, processing such as grinding or polishing is carried out as the case requires, to obtain a glass plate having a prescribed size and shape. As the forming method, a float process suitable for mass production is particularly preferred. Otherwise, a continuous forming method other than the float process, i.e. a fusion method or a downdraw method is also suitable.

EXAMPLES

With respect to glass in each of Examples 1 to 35 in Tables 1 to 4, materials for the respective components were blended to obtain a composition shown by mol % in the rows for from $SiO_2$ to $K_2O$ in the Tables and melted at a temperature of from 1,550 to 1,600° C. for from 3 to 5 hours using a platinum crucible. In the melting, a platinum stirrer was put into the molten glass, and the glass was stirred for 2 hours to be homogenized. Then, the molten glass was cast to form a plate and annealed to room temperature at a cooling rate of 1° C./min, and then, processed into a glass plate having a desired thickness. In the Tables, $R_2O$ represents the total of the respective contents (unit: mol %) of $Li_2O$, $Na_2O$ and $K_2O$, and Si—Al represents the difference (unit: mol %) in content between $SiO_2$ and $Al_2O_3$.

With respect to glass in Example 36 having a composition shown by mol % in the rows for from $SiO_2$ to $K_2O$ in Table 4, a glass plate having a thickness of about 0.6 mm was separately prepared.

Glasses in Examples 1 to 29 represent working examples of the present invention, and glasses in Examples 30 to 36 are the above-mentioned glass A and represent Comparative Examples wherein $SiO_2$—$Al_2O_3$ is less than 53.3 mol %.

With respect to each glass plate thus obtained, the density d (unit: g/cm³), the above-mentioned average linear expansion coefficient α (unit: ×10⁻⁷/° C.), the Young's modulus E (unit: GPa), the specific modulus E/d (unit: MNm/kg), the glass transition point Tg (unit: ° C.), the above-mentioned $C_R$ (unit: nmol/cm²) and the above-mentioned sulfuric acid etching rate w (unit: nm/h) were measured by the following methods. The results are shown in the Tables.

d: Measured by an Archimedes method using from 20 to 50 g of glass free from bubbles.

α: By means of a differential thermal dilatometer and using quartz glass as a reference sample, the rate of elongation of glass when it was heated at a rate of 5° C./min from room temperature to a temperature at which the glass was softened and elongation was no longer observed, i.e. to an yield point, was measured, and from the obtained thermal expansion curve, an average linear expansion coefficient within a range of −50 to 70° C. was calculated.

E: With respect to a glass plate having a thickness of from 5 to 10 mm and a size of 3 cm square, the measurement was carried out by an ultrasonic pulse method.

Tg: By means of a differential thermal dilatometer and using quartz glass as a reference sample, the rate of elongation of glass when it was heated at a rate of 5° C./min from room temperature to its yield point, and the temperature corresponding to the critical point in the obtained thermal expansion curve was taken as the glass transition point.

$C_R$: Both sides of a glass plate having a thickness of from 1 to 2 mm and a size of 4 cm×4 cm were mirror-polished with cerium oxide, then cleaned by using calcium carbonate and a neutral detergent, then put in a highly accelerated useful life testing apparatus (unsaturated type pressure cooker EHS-411M manufactured by ESPEC Corp.) and left to stand for 20 hours in a steam atmosphere at 120° C. under 0.2 MPa. In a cleaned plastic bag with a zipper, the sample after the test and 20 ml of ultrapure water were put, and the surface precipitates were dissolved for 10 minutes by an ultrasonic washing machine, and by means of ICP-MS, the eluted amounts of the respective alkali components were quantitatively analyzed. The eluted amounts were calculated by mol and standardized by the sample surface area. Further, in Example 36, measurements were carried out with respect to four glass plates, and their average value is shown in Table 4, but the variation in the measured values was ±12%.

w: The measuring method is omitted here, since it was described above. Further, in Example 36, measurements were carried out with respect to four glass plates, and their average value is shown in Table 4, but the variation in the measured values was ±12%.

FIG. 1 shows a relationship between x=$SiO_2$—$Al_2O_3$ and the sulfuric acid etching rate w thereby obtained.

From this Fig., it is evident that when x is less than 53.3%, w becomes remarkably large and tends to exceed 1.0 nm/h, and from Examples 31 and 30 forming an envelope curve in this region, this increase rate is calculated to be 1.6 nm·h⁻¹·%⁻¹.

On the other hand, when x is at least 53.3%, there is no change in the tendency such that w increases as x decreases, but w is at most 1.0 nm/h, and yet the tendency becomes weak. That is, from Examples 22 and 28 forming an envelope curve in this region, this increase rate is calculated to be 0.275 nm·h⁻¹·%⁻¹.

Further, from Examples 22 and 3 forming an envelope curve in a region where x is at least 53.5%, this increase rate is calculated to be 0.17 nm·h⁻¹·%⁻¹, i.e. the increase rate becomes further smaller.

That is, when x is less than 53.3%, not only w is large, but also w changes more by a change of x. Whereas, when x is at least 53.3%, there is a distinct effect such that not only w is small, but the change of w by a change of x is also small, whereby the quality of glass is stabilized, and it is evident from the Fig. that such an effect becomes more remarkable when x is at least 53.5%.

Further, with respect to glasses in Examples 1 to 4, 30, 31 and 36, the durability against a sulfuric acid/hydrogen peroxide mixed liquid was measured as follows. That is, a doughnuts-form glass plate (a circular glass plate having a thickness of from 0.6 to 0.7 mm and an outer diameter of 65 mm and having a hole with a diameter of 20 mm at its center) wet with ion-exchanged water was put in a mixed liquid comprising 44 wt % sulfuric acid (12 N) and 7 wt % hydrogen peroxide water and maintained at 80° C., and immersed for 20 minutes. The glass plate after the immersion was washed with pure water, and the glass surface was observed by means of an optical surface analyzer (OSA) manufactured by KLA Tencor. Here, the set conditions for OSA were such that Laser was Circumferential, and Polarization was Q-Polarization Phaze. With respect to each glass, from 5 to 10 plates were inspected, and the defect-formation rate p (unit: %) obtained by dividing the number of glass plates having defects observed on the surface by the number of glass plates inspected, is shown in the Tables. In Examples 1 to 4 wherein w was from 0.59 to 0.81 nm/h, p was from 0 to 20%, i.e. no substantial defects were observed, but in Examples 30, 31 and 36 wherein w is from 1.13 to 1.93 nm/h, p was 100%, i.e. defects were observed on all glass plates.

Figure 2:
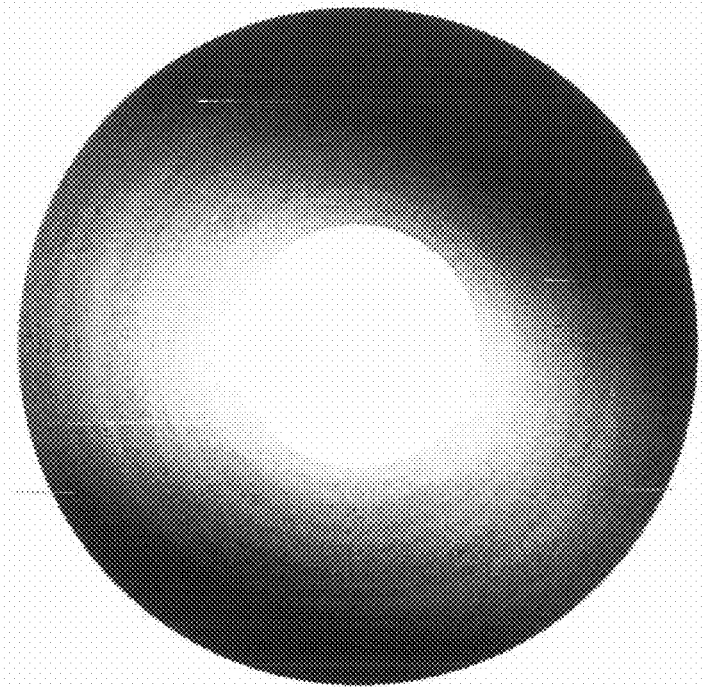
FIG. 2 is a view showing a result of an observation of the surface of a doughnuts-form glass plate (Example 36) before immersion in a mixed liquid of sulfuric acid and hydrogen peroxide, by means of an optical surface analyzer (OSA).
Figure 3:
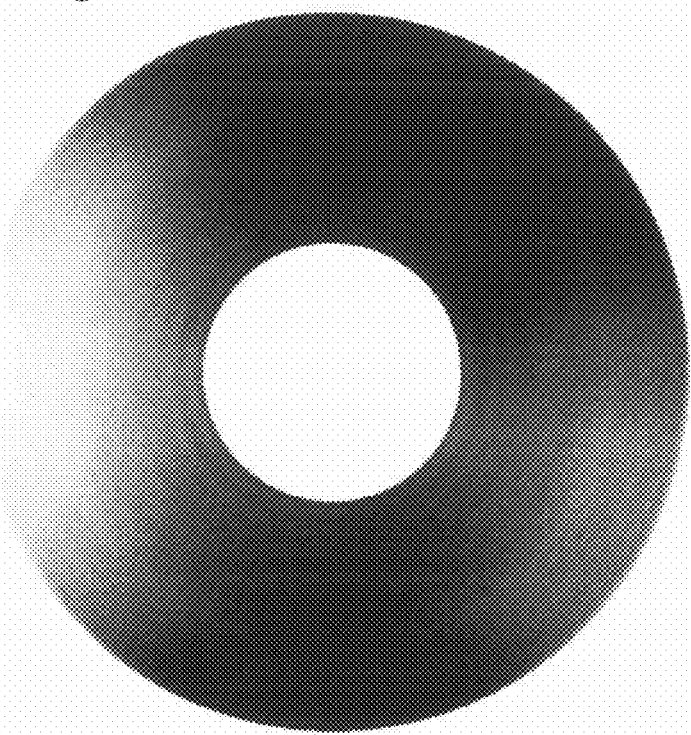
FIG. 3 is a view showing a result of an observation of the surface after immersing the doughnuts-form glass plate made of glass (Example 3) of the present invention in the above mixed liquid, by means of OSA.

FIG. 2 shows a result of observation, by means of OSA, of the surface of the glass plate in Example 36 before immersion in the mixed liquid of sulfuric acid and hydrogen peroxide, and FIG. 3 shows a result of observation, by means of OSA, of the surface of the glass plate in Example 3 after immersion in the mixed liquid. From the comparison of both, it is evident that defects such as irregularities did not form on the surface of the glass plate in Example 3 by the immersion in the above mixed liquid. This is considered attributable to the fact that w of the glass in Example 3 was such a small value as 0.81 nm/h. Here, the results of observation by OSA with respect to Example 3 before immersion in the mixed liquid is not shown in the drawings, but like in FIG. 2, it was one wherein defects such as irregularities were not formed.

Figure 4:
FIG. 4 is a view showing a result of an observation of the surface after immersing a doughnuts-form glass plate made of glass (Example 36) in Comparative Example of the present invention in the above mixed liquid, by means of OSA.

FIG. 4 shows a result of OSA observation of the surface of the glass plate in Example 36 after immersion in the above mixed liquid. In the Fig., an irregularity which looks white on the left hand side and an irregularity which looks black at the upper right are broadly present, and streaky irregularities which look slightly pale white are present from the slightly upper left towards the slightly lower right. These irregularities are considered to be ones caused by water non-uniformly deposited on the glass plate surface immediately before the immersion in the above mixed liquid, and formed by erosion of the glass plate surface by sulfuric acid diluted with water i.e. by dilute sulfuric acid.

Further, also in Tables 5 and 6, Examples 37 to 43 are shown as working examples of the present invention and Examples 44 to 55 are shown as comparative examples.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 65.0 | 65.5 | 65.5 | 66.0 | 65.5 | 66.0 | 65.5 | 66.0 | 66.0 |
| $Al_2O_3$ | 11.5 | 11.5 | 12.0 | 12.0 | 11.0 | 10.5 | 12.0 | 12.0 | 12.0 |
| $ZrO_2$ | 1.8 | 1.8 | 1.8 | 1.8 | 1.8 | 1.8 | 0.8 | 0.3 | 1.8 |
| $Li_2O$ | 12.8 | 12.3 | 11.8 | 12.8 | 12.8 | 12.8 | 12.8 | 12.8 | 11.3 |
| $Na_2O$ | 5.5 | 5.5 | 5.5 | 4.0 | 5.5 | 5.5 | 5.5 | 5.5 | 5.5 |
| $K_2O$ | 3.4 | 3.4 | 3.4 | 3.4 | 3.4 | 3.4 | 3.4 | 3.4 | 3.4 |
| Si—Al | 53.5 | 54.0 | 53.5 | 54.0 | 54.5 | 55.5 | 53.5 | 54.0 | 54.0 |
| $R_2O$ | 21.7 | 21.2 | 20.7 | 20.2 | 21.7 | 21.7 | 21.7 | 21.7 | 20.2 |
| d | 2.47 | 2.47 | 2.47 | 2.46 | 2.47 | 2.47 | 2.46 | 2.44 | 2.43 | 2.46 |
| α | 72.0 | 72.6 | 71.4 | 67.7 | 72.4 | 72.5 | 73.1 | 73.3 | 70.3 |
| Tg | 522 | 517 | 527 | 537 | 512 | 507 | 503 | 499 | 536 |
| E | 83.0 | 82.6 | 82.8 | 83.0 | 82.8 | 82.5 | 81.7 | 81.2 | 82.4 |
| E/d | 33.7 | 33.5 | 33.6 | 33.8 | 33.6 | 33.5 | 33.5 | 33.5 | 33.5 |
| $C_R$ | 2.38 | 2.89 | 2.14 | 2.65 | 2.78 | 3.27 | 2.23 | 3.43 | 2.10 |
| p | 20 | 0 | 0 | 0 |  |  |  |  |  |
| w | 0.79 | 0.73 | 0.81 | 0.59 | 0.55 | 0.41 | 0.68 | 0.59 | 0.67 |

TABLE 2

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| $SiO_2$ | 65.5 | 65.5 | 66.0 | 66.0 | 66.0 | 65.5 | 66.5 | 66.0 | 65.0 |
| $Al_2O_3$ | 12.0 | 12.0 | 12.0 | 11.0 | 11.0 | 11.5 | 11.0 | 11.5 | 11.5 |
| $ZrO_2$ | 1.8 | 1.8 | 1.8 | 1.8 | 1.3 | 1.3 | 1.3 | 1.3 | 2.0 |
| $Li_2O$ | 12.8 | 12.8 | 12.8 | 12.3 | 12.8 | 12.8 | 12.3 | 12.3 | 12.8 |
| $Na_2O$ | 4.5 | 5.5 | 5.5 | 5.5 | 5.5 | 5.5 | 5.5 | 5.5 | 5.5 |
| $K_2O$ | 3.4 | 2.4 | 1.9 | 3.4 | 3.4 | 3.4 | 3.4 | 3.4 | 3.2 |
| Si—Al | 53.5 | 53.5 | 54.0 | 55.0 | 55.0 | 54.0 | 55.5 | 54.5 | 53.5 |
| $R_2O$ | 20.7 | 20.7 | 20.2 | 21.2 | 21.7 | 21.7 | 21.2 | 21.2 | 21.5 |
| d | 2.46 | 2.46 | 2.46 | 2.46 | 2.45 | 2.45 | 2.45 | 2.45 | 2.45 |
| α | 69.4 | 69.2 | 67.2 | 72.4 | 72.4 | 72.7 | 71.0 | 69.9 | 69.8 |
| Tg | 533 | 533 | 535 | 513 | 501 | 506 | 507 | 509 | 518 |
| E | 83.1 | 83.9 | 84.2 | 82.3 | 81.7 | 82.1 | 81.6 | 81.8 | 83.3 |
| E/d | 33.8 | 34.0 | 34.2 | 33.4 | 33.3 | 33.5 | 33.3 | 33.4 | 33.7 |
| $C_R$ | 2.26 | 2.30 | 2.68 | 2.42 | 2.37 | 2.14 | 2.46 | 2.20 | 2.55 |
| p |  |  |  |  |  |  |  |  |  |
| w | 0.71 | 0.66 | 0.51 | 0.50 | 0.46 | 0.64 | 0.40 | 0.56 | 0.66 |

TABLE 3

|   | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| $SiO_2$ | 65.5 | 65.0 | 65.0 | 65.3 | 65.3 | 65.5 | 65.5 | 65.3 | 65.0 |
| $Al_2O_3$ | 11.5 | 11.5 | 11.2 | 10.8 | 11.2 | 11.3 | 11.3 | 11.3 | 11.2 |
| $ZrO_2$ | 1.8 | 2.0 | 2.3 | 2.7 | 2.3 | 2.0 | 2.0 | 2.0 | 2.3 |
| $Li_2O$ | 12.8 | 12.8 | 12.8 | 12.8 | 12.8 | 12.8 | 12.8 | 13.2 | 12.8 |
| $Na_2O$ | 5.5 | 4.5 | 4.5 | 4.2 | 4.2 | 4.5 | 5.5 | 5.3 | 5.3 |
| $K_2O$ | 2.9 | 4.2 | 4.2 | 4.2 | 4.2 | 3.9 | 2.9 | 2.9 | 3.4 |
| Si—Al | 54.0 | 53.5 | 53.8 | 54.5 | 54.1 | 54.2 | 54.2 | 54.0 | 53.8 |
| $R_2O$ | 21.2 | 21.5 | 21.5 | 21.2 | 21.2 | 21.2 | 21.2 | 21.4 | 21.5 |
| d | 2.45 | 2.45 | 2.45 | 2.49 | 2.48 | 2.47 | 2.47 | 2.47 | 2.48 |
| α | 70.7 | 73.3 | 73.9 | 70.1 | 70.9 | 69.8 | 69.3 | 69.9 | 70.7 |
| Tg | 517 | 520 | 524 | 526 | 527 | 520 | 519 | 518 | 520 |
| E | 83.2 | 82.6 | 82.8 | 83.4 | 83.0 | 83.1 | 83.7 | 83.8 | 83.6 |
| E/d | 33.8 | 33.4 | 33.4 | 33.5 | 33.5 | 33.7 | 33.9 | 33.9 | 33.7 |
| $C_R$ | 2.75 | 2.51 | 2.54 | 2.45 | 1.92 | 1.94 | 2.17 | 2.07 | 1.94 |
| p |  |  |  |  |  |  |  |  |  |
| w | 0.48 | 0.43 | 0.53 | 0.64 | 0.73 | 0.68 | 0.61 | 0.62 | 0.74 |

TABLE 4

|   | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|
| $SiO_2$ | 64.8 | 64.9 | 64.5 | 65.0 | 65.0 | 65.0 | 65.0 | 64.7 | 64.7 |
| $Al_2O_3$ | 11.5 | 11.5 | 12.0 | 12.0 | 12.0 | 12.0 | 12.0 | 11.8 | 11.8 |
| MgO | 0 | 0 | 0 | 0 | 0 | 0 | 0 | 0 | 0.2 |
| CaO | 0 | 0 | 0 | 0 | 0 | 0 | 0 | 0 | 0.2 |
| $ZrO_2$ | 2.0 | 2.1 | 1.8 | 1.8 | 1.3 | 1.8 | 1.8 | 2.0 | 1.8 |
| $Li_2O$ | 12.8 | 12.8 | 12.8 | 12.3 | 12.8 | 12.8 | 12.8 | 12.8 | 12.5 |
| $Na_2O$ | 5.5 | 5.3 | 5.5 | 5.5 | 5.5 | 5.0 | 5.5 | 5.3 | 5.4 |
| $K_2O$ | 3.4 | 3.4 | 3.4 | 3.4 | 3.4 | 3.4 | 2.9 | 3.4 | 3.4 |
| Si—Al | 53.3 | 53.4 | 52.5 | 53.0 | 53.0 | 53.0 | 53.0 | 52.9 | 52.9 |
| $R_2O$ | 21.7 | 21.5 | 21.7 | 21.2 | 21.7 | 21.2 | 21.2 | 21.5 | 21.3 |
| d | 2.47 | 2.47 | 2.47 | 2.47 | 2.45 | 2.47 | 2.47 | 2.47 | 2.47 |
| α | 71.1 | 70.2 | 72.3 | 72.3 | 72.2 | 71.1 | 70.7 | 71.4 | 72.5 |
| Tg | 516 | 521 | 520 | 525 | 513 | 519 | 526 | 524 | 520 |
| E | 83.3 | 83.4 | 83.1 | 83.0 | 82.5 | 83.3 | 83.6 | 83.5 | 83.1 |
| E/d | 33.7 | 33.7 | 33.6 | 33.6 | 33.6 | 33.8 | 33.9 | 33.8 | 33.6 |
| $C_R$ | 1.98 | 2.09 | 2.79 | 2.21 | 2.57 | 2.30 | 2.05 | 2.02 | 2.47 |
| p |  |  | 100 | 100 |  |  |  |  | 100 |
| w | 0.97 | 0.95 | 1.93 | 1.13 | 1.04 | 1.02 | 0.91 | 1.36 | 1.42 |

TABLE 5

|   | Ex. 37 | Ex. 38 | Ex. 39 | Ex. 40 | Ex. 41 | Ex. 42 | Ex. 43 | Ex. 44 | Ex. 45 |
|---|---|---|---|---|---|---|---|---|---|
| $SiO_2$ | 67.0 | 68.2 | 63.0 | 65.0 | 64.2 | 66.0 | 67.5 | 64.5 | 61.5 |
| $Al_2O_3$ | 9.0 | 14.8 | 9.5 | 10.0 | 10.8 | 12.0 | 12.5 | 12.0 | 15.0 |
| $ZrO_2$ | 3.0 | 0 | 3.5 | 3.0 | 3.0 | 3.0 | 3.0 | 1.0 | 1.0 |
| $Li_2O$ | 14.0 | 8.0 | 9.5 | 12.0 | 16.0 | 8.0 | 9.0 | 13.0 | 13.0 |
| $Na_2O$ | 0 | 2.0 | 8.0 | 5.0 | 0 | 6.0 | 8.0 | 5.0 | 5.0 |
| $K_2O$ | 7.0 | 7.0 | 6.5 | 5.0 | 6.0 | 5.0 | 0 | 4.5 | 4.5 |
| Si—Al | 58.0 | 53.4 | 53.5 | 55.0 | 53.4 | 54.0 | 55.0 | 52.5 | 46.5 |
| $R_2O$ | 21.0 | 17.0 | 24.0 | 22.0 | 22.0 | 19.0 | 17.0 | 22.5 | 22.5 |
| d | 2.48 | 2.39 | 2.53 | 2.50 | 2.49 | 2.50 | 2.49 | 2.45 | 2.46 |
| α | 71 | 68 | 87 | 76 | 70 | 72 | 61 | 76 | 75 |
| Tg | 515 | 575 | 507 | 518 | 514 | 572 | 594 | 502 | 524 |
| E | 82 | 77 | 79 | 82 | 85 | 81 | 85 | 81 | 83 |
| E/d | 33 | 32 | 31 | 33 | 34 | 32 | 34 | 33 | 34 |
| $C_R$ | 6.3 | 1.8 | 5.1 | 4.9 | 3.8 | 1.2 | 0.9 | 9.0 | 2.5 |
| p |  |  |  |  |  |  |  |  |  |
| w | 0.33 | 0.86 | 0.81 | 0.44 | 0.86 | 0.62 | 0.44 | 1.64 | 528 |

TABLE 6

|   | Ex. 46 | Ex. 47 | Ex. 48 | Ex. 49 | Ex. 50 | Ex. 51 | Ex. 52 | Ex. 53 | Ex. 54 | Ex. 55 |
|---|---|---|---|---|---|---|---|---|---|---|
| $SiO_2$ | 70.0 | 69.0 | 63.0 | 69.0 | 68.0 | 64.0 | 64.0 | 65.0 | 66.0 | 65.9 |
| $Al_2O_3$ | 9.0 | 8.0 | 16.5 | 11.0 | 14.0 | 9.0 | 10.0 | 9.0 | 9.0 | 9.0 |
| MgO | 0 | 0 | 0 | 0 | 0 | 0 | 0 | 0 | 0 | 3.0 |
| $TiO_2$ | 0 | 0 | 0 | 0 | 0 | 0 | 0 | 0 | 0 | 1.0 |
| $ZrO_2$ | 1.0 | 1.0 | 3.0 | 0 | 2.0 | 2.0 | 2.0 | 2.0 | 1.0 | 0.6 |
| $Li_2O$ | 10.0 | 13.0 | 10.0 | 7.0 | 12.0 | 16.0 | 17.0 | 14.0 | 14.0 | 10.7 |

TABLE 6-continued

|  | Ex. 46 | Ex. 47 | Ex. 48 | Ex. 49 | Ex. 50 | Ex. 51 | Ex. 52 | Ex. 53 | Ex. 54 | Ex. 55 |
| --- | --- | --- | --- | --- | --- | --- | --- | --- | --- | --- |
| $Na_2O$ | 8.0 | 5.0 | 4.0 | 6.0 | 3.0 | 5.0 | 5.0 | 9.0 | 2.0 | 6.8 |
| $K_2O$ | 2.0 | 4.0 | 3.5 | 7.0 | 1.0 | 4.0 | 2.0 | 1.0 | 8.0 | 3.0 |
| Si—Al | 61.0 | 61.0 | 46.5 | 58.0 | 54.0 | 55.0 | 54.0 | 56.0 | 57.0 | 56.9 |
| $R_2O$ | 20.0 | 22.0 | 17.5 | 20.0 | 16.0 | 25.0 | 24.0 | 24.0 | 24.0 | 20.5 |
| d | 2.43 | 2.43 | 2.50 | 2.40 | 2.45 | 2.48 | 2.48 | 2.48 | 2.44 | 2.45 |
| α | 72 | 75 | 62 | 80 | 54 | 79 | 73 | 77 | 82 | 74 |
| Tg | 512 | 478 | 615 | 520 | 595 | 461 | 476 | 476 | 462 | 506 |
| E | 80 | 80 | 85 | 75 | 86 | 84 | 86 | 84 | 79 | 82 |
| E/d | 33 | 33 | 34 | 31 | 35 | 34 | 35 | 34 | 32 | 33 |
| $C_R$ | 23.1 | 48.1 | 0.2 | 14.1 | 0.8 | 27.3 | 17.1 | 25.2 | 36.6 | 6.7 |
| p |  |  |  |  |  |  |  |  |  |  |
| w | 0.33 | 0.33 | 529 | 0.33 | 0.62 | 0.44 | 0.62 | 0.37 | 0.34 | 0.35 |

The entire disclosure of Japanese Patent Application No. 2010-239515 filed on Oct. 26, 2010 including specification, claims, drawings and summary is incorporated herein by reference in its entirety.

What is claimed is:

1. A glass which comprises, as represented by mol % based on the following oxides, from 62.5 to 69% of $SiO_2$, from 9 to 15.5% of $Al_2O_3$, from 8 to 16 of $Li_2O$, from 0 to 8% of $Na_2O$, from 0 to 7% of $K_2O$ and from 0 to 3.5% of $ZrO_2$, provided that $SiO_2$—$Al_2O_3$ is at least 53.3% and at most 56.0%, $Li_2O$+$Na_2O$+$K_2O$ is from 17 to 24%, and the total of contents of the above six components is at least 97%.

2. The glass according to claim 1, wherein $SiO_2$ is from 64 to 68%, $Al_2O_3$ is from 9 to 13%, $Li_2O$ is from 10 to 15%, $Na_2O$ is from 3 to 7%, $K_2O$ is from 1 to 5% and $Li_2O$+$Na_2O$+$K_2O$ is from 19 to 23%.

3. The glass according to claim 1, wherein the total of contents of the above six components is at least 98%.

4. The glass according to claim 1, which contains from 0 to 2% of MgO.

5. The glass according to claim 1, which does not contain any one of CaO, SrO and BaO, or contains at least one component of CaO, SrO and BaO, provided that the total of their contents is at most 1%.

6. A glass substrate made of the glass as defined in claim 1.

7. A chemically strengthened glass substrate having the glass substrate as defined in claim 6 chemically strengthened.

8. A magnetic disk having a magnetic recording layer formed on a glass substrate made of the glass as defined in claim 1 or on a chemically strengthened glass substrate having a glass substrate made of the same glass chemically strengthened.

9. The glass according to claim 1, which has a sulfuric acid etching rate w of at most 1.0 nm/h.

10. The glass according to claim 1, which has a sulfuric acid etching rate w of at most 0.6 nm/h.

11. The glass according to claim 1, which has a Young's modulus E of at least 76 GPa.

12. The glass according to claim 1, which has a specific modulus E/d of at least 28 MNm/kg.

13. The glass according to claim 1, which has a glass transition point Tg of at least 499° C.

14. The glass according to claim 1, which has a glass transition point Tg of at least 510° C.

15. The glass according to claim 1, wherein $C_R = C_{Li} + C_{Na} + C_K$ is at most 12 nmol/cm² at a time when a glass substrate made from said glass is held for 20 hours in a steam atmosphere at 120° C. under 0.2 MPa, wherein $C_{Li}$, $C_{Na}$ and $C_K$, represent the amount of Li, the amount of Na and the amount of K precipitated on the glass surface, respectively.

16. The glass according to claim 15 wherein $C_R = C_{Li} + C_{Na} + C_K$ is at most 3.5 nmol/cm².

17. The glass according to claim 1, wherein $Al_2O_3$ is present in an amount of 11.5 to 13 mol %.

* * * * *